April 28, 1936. H. A. McILVAINE 2,038,584
FOOD CONTAINER AND METHOD OF PREPARING THE SAME
Filed May 4, 1923
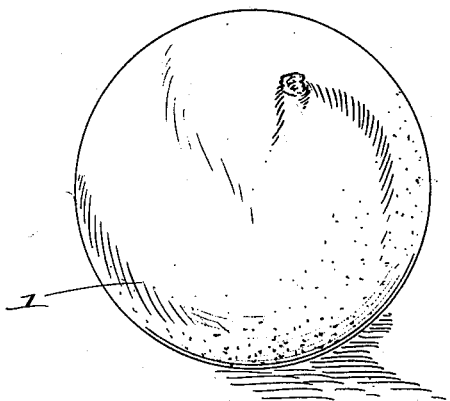
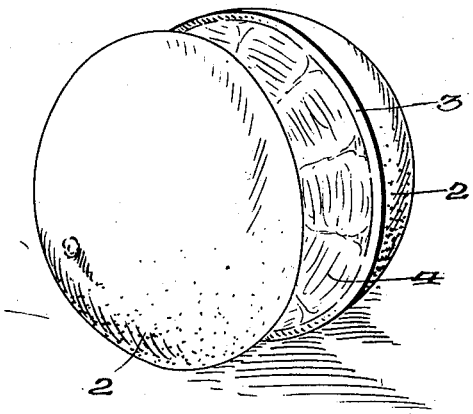
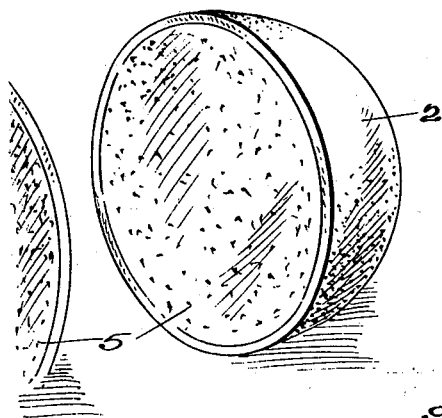
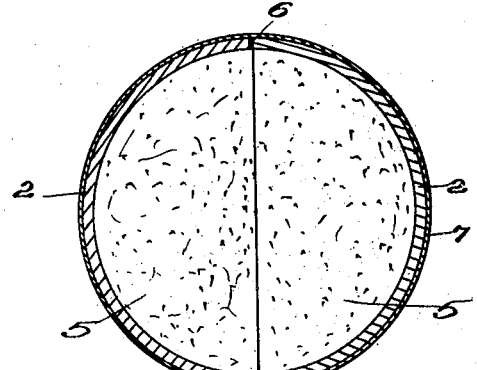
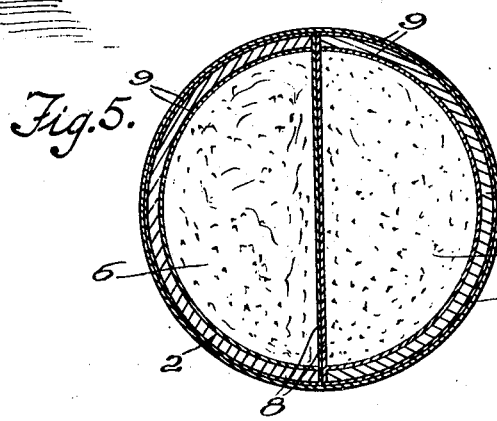
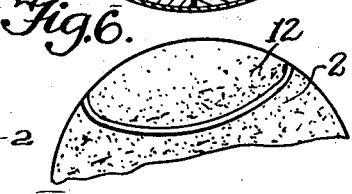
Inventor
Hubert A. McIlvaine
By
his Attorney Patented Apr. 28, 1936

2,038,584

UNITED STATES PATENT OFFICE 2,038,584

FOOD CONTAINER AND METHOD OF PREPARING THE SAME

Hubert A. McIlvaine, Cleveland Heights, Ohio, assignor to The Continental Fruit Products Company, Frostproof, Fla., a corporation of Florida Application May 4, 1928, Serial No. 275,207

10 Claims. (Cl. 99—181)

This invention relates to an improvement in food containers and method of preparing the same.

It has been found that in a number of citrous fruit States and countries, where citrous fruits are raised, a large quantity of these are wasted because it is impracticable and almost impossible to ship glass or other containers into the States to contain the citrous fruits either in a preserved or other form. The reason for this is the high tariff and high railroad rates, which preclude any commercial shipment particularly of glass containers into a citrous fruit State. This is particularly true of the State of Florida, where a large quantity of citrous fruits of various kinds, such as oranges, grape-fruit, and citron is being wasted annually.

The object of this invention is to utilize the hull or outer skin of the citrous fruits as a container for a food product, preferably some form of marmalade or preserves made from the citrous fruit itself, or the fruit juice. Where the citrous fruits are packed and shipped in their natural state, they do not keep satisfactorily, and become decayed and unfit for use after some considerable period of time. However, by preserving the fruit or edible interior thereof, or extracting the juice therefrom, these may be sealed up in the hull or outer portion of the citrous fruit, which otherwise would be wasted, and the latter portion is used as the container for the preserved or conserved inner portion of the fruit, in this way eliminating the necessity of using any additional containers such as glass or metal for the preserved fruit, and greatly decreasing the cost of transportation and preparing the same for market.

In the accompanying drawing:

Fig. 1 is a side elevation of the fruit in its natural state;

Fig. 2 is a perspective view showing the first step of the process with the fruit cut in half;

Fig. 3 is a similar view after the interior of the fruit has been removed, and the hull filled with a preserved or other form of food product;

Fig. 4 is a sectional view through the complete fruit container;

Fig. 5 is a similar view of a modified form of container; and

Fig. 6 is a perspective view of a further modification thereof.

The invention is particularly applicable to citrous fruits, although it may also apply to any other type of fruits or the like. For the purpose of illustration, however, the invention is described in connection with citrous fruit, such as oranges or grape-fruit, which is shown in Fig. 1, and designated generally by the numeral 1. This orange is cut into two halves 2 along the line 3, approximately at the center thereof, preferably, although it is possible to cut off only the upper portion 12 in Fig. 6 and use that as a cap for the container. The edible inner portion 4 of the fruit is removed, and some form of edible food product 5 is packed into the hull or skin of the fruit to fill each of the two halves 2. This food product 5 may be of the edible interior portion of the fruit after it has been conserved or preserved, so as to avoid the possibility of its becoming decayed. The outer hull or skin of the fruit is preferably preserved also before the preserved food product is packed thereinto, so as to render the article edible. After the food product or preserved contents are packed into the portions of the hull or skin, the two portions are placed together, as shown in Fig. 4, and are sealed along their cut edges 3 by means of sealing-wax, paraffin, or some other sealing substance designated generally by the numeral 6. This renders the container formed by the hull or skin of the fruit entirely air-tight, enclosing the preserves or other food product contained therein in an air-tight condition, where it will be kept in a proper state to prevent its deterioration through the action of the elements. This forms a container for the food product, which is as effective in maintaining the same in its preserved condition as either glass or metal containers usually employed.

For the purpose of transportation, the fruit container may be enclosed in a paper cover 7 which passes entirely around the same, and may be hermetically sealed, being of a character such as to permit this, and thus further insure maintaining the container perfectly air-tight.

After having been carefully sealed, the fruit container may be packed in any form of box or other container for the same, as, for instance, in the crates ordinarily employed to ship such fruit in its natural condition. In this way there is no probability of breaking the container for the preserved or other food products contained therein, and there is no probability of destruction of the container through the breakage, as exists where the containers are of glass, and this also facilitates the easy handling and packing of the containers as well as decreasing the cost of transportation.

Whenever it is desired to open the container to use the contents, it is only required that the paper cover 7 be removed and a knife or other sharp object may be used to break the seal at 6 between the two halves, and the latter may be thus opened and the halves used as dishes to contain the marmalade, etc. If the peeling or hull of the citrous fruit has been conserved in any well-known manner such as by the usual sugar solutions or the like, the hull may also be eaten.

In the modified form shown in Fig. 5, each half of the container after having been filled with the preserved or other food product, is sealed by paraffine, cardboard or other form of seal which covers the open top of the same, which seals are designated generally by the numeral 8 in Fig. 5, and the two halves may then be placed together with the seals face to face and enclosed in the paper covering 7 as before.

If the hull or skin of the fruit is not conserved, in order to prevent decay and deterioration of the contents by reason thereof, the hull is preferably coated at least on its inner surface, but it may be coated on both its inner and outer surfaces with paraffin, rubber, or other substance designated generally by the numeral 9. This outside coating may also serve the same purpose as the paper covering 7, which may thus be eliminated or omitted.

The containers formed by the hull or skin of the fruit may be used to contain any form of food product, but they are particularly valuable for containing and receiving the preserved edible interior portion of the fruit, since the latter will be removed to form the containers, and may be used to fill the same after having been properly treated or preserved.

On the other hand, however, the juice of the fruit may be extracted from the interior pulp, and after removal of the latter the skin or hull may be closed in the manner above described, and a small opening formed in one side through which the juice is inserted, a suitable plug or other member being used to close the opening, but being removable for the insertion of a straw to extract the contents.

I claim:

1. A food container comprising an edible hull of preserved natural fruit or the like from which the interior portion has been removed, and having an opening for receiving a food product, and to be sealed, and a cap for said opening and having sealing connection with the edges of said opening.

2. A food container comprising an edible air tight hull of preserved natural fruit from which the interior portion has been removed, and having an opening for receiving a food product, and an edible portion of the preserved hull for closing and sealing said opening.

3. A food container comprising an edible air tight hull of preserved natural fruit from which the interior portion has been removed, and adapted to be filled with a food product, and to be sealed, said hull having an opening through which the food product is introduced into the hull, and a stopple for closing and sealing said opening.

4. A method of forming a food container from the hull of natural fruit or the like comprising opening a portion of the hull, removing the interior portion from the hull, preserving the hull to render it edible, and approximately air tight, filling the hull with a food product or the like, and capping and sealing the opening in the hull.

5. A method of forming a food container from the hull of natural fruit or the like, comprising removing a portion of the hull to form an opening, removing the edible interior portion from within the hull, conserving the hull with sugar to render it edible and air tight, thereafter filling the conserved hull with a food product or the like, and capping and sealing the opening in the hull with the portion removed to form the opening.

6. A food container comprising an air tight edible hull of preserved natural fruit having a hollow interior adapted to be filled with a food product and sealed, said hull having a relatively small opening substantially smaller in diameter than the diameter of the hull and through which the food product is introduced into the hull, and a preserved air tight edible portion of the hull corresponding in size with the opening and fitted and sealed to the opening.

7. A food container comprising an air tight edible hull of preserved natural fruit having a hollow interior adapted to be filled with a food product and sealed, said hull having a relatively small opening substantially smaller in diameter than the diameter of the hull and through which the food product is introduced into the hull, and a preserved air tight edible portion of the hull corresponding in size with the opening and fitted and sealed to the opening, said hull being permanently sealed and air tight, and an approximately transparent paper covering enclosing said hull and providing a sealed casing therearound.

8. A food container comprising a hull of natural fruit having a hollow interior adapted to be filled with food products and sealed, said hull having the walls thereof preserved and air tight throughout, and having an opening for the introduction of the food products, and an airtight portion of the hull corresponding in size with the opening and fitted and sealed thereto.

9. A food container comprising a hull of natural fruit having a hollow interior adapted to be filled and sealed, said hull having the walls thereof preserved against decay and having an opening for the introduction of products, and means for closing and sealing said opening.

10. A food container comprising a hull of natural fruit having a hollow interior adapted to be filled and sealed, said hull having the walls thereof coated inside and outside preserving said walls against decay, said hull having an opening for the introduction of products, and means for closing and sealing said opening.

HUBERT A. McILVAINE.